US005896656A

United States Patent [19]

Laws

[11] Patent Number: 5,896,656
[45] Date of Patent: Apr. 27, 1999

[54] METHOD OF ATTACHING AN INTERNAL COMBUSTION ENGINE PISTON OILER

[76] Inventor: James M. Laws, 34826 LaPlace Ct., Eustis, Fla. 32736

[21] Appl. No.: 08/972,427

[22] Filed: Nov. 18, 1997

[51] Int. Cl.[6] ........ B23P 15/00

[52] U.S. Cl. ........ 29/888.011; 29/888.01

[58] Field of Search ........ 29/888.011, 888.01, 29/888; 123/196 M, 193.1

[56] References Cited

U.S. PATENT DOCUMENTS

| | | | |
|---|---|---|---|
| 2,011,833 | 8/1935 | Sorg | 123/196 |
| 4,280,455 | 7/1981 | Yamaguchi et al. | 123/196 M |
| 4,742,803 | 5/1988 | Chiles et al. | 123/196 M |
| 4,794,896 | 1/1989 | Tsai et al. | 123/193 |
| 5,002,025 | 3/1991 | Crouse | 123/196 |
| 5,201,805 | 4/1993 | Schubert | 123/196 |

*Primary Examiner*—Irene Cuda

*Attorney, Agent, or Firm*—William M. Hobby, III

[57] ABSTRACT

A method of attaching an internal combustion engine piston oiler includes the step of removing a crank shaft from an internal combustion engine to expose a plurality of block main bearing surfaces, selecting a drill guide shaped to fit one of the engine block main bearing surfaces, which drill guide has a predetermined drill guide bore therethrough, and positioning the selected drill guide on the engine block main bearing surface. The method includes positioning a drill bit through the bore in the selected drill guide and drilling a predetermined bore through the engine block webbing from one main bearing surface into the rear of the engine cylinder and then tapping the bore drilled into the engine block and installing an oil metering jet into the drilled and tap bore. The method also includes drilling an aperture into the oil groove in the crank shaft main bearing generally aligned with the engine main bearing surface drilled opening and then replacing the crank shaft in the engine block with the engine oil jet installed to enhance the lubrication of the engine piston dome and wrist pin. The process is repeated for each of the engine cylinders.

9 Claims, 2 Drawing Sheets

METHOD OF ATTACHING AN INTERNAL COMBUSTION ENGINE PISTON OILER

BACKGROUND OF THE INVENTION

The present invention relates to a method of attaching a piston oiler to an internal combustion engine and especially to attaching a piston oiler to spray the piston dome and wrist pin area of each piston in an internal combustion engine.

Engine oil serves many purposes in a racing engine including lubrication of the engine components and as an engine coolant. With the increasingly popular use of creating a vacuum inside the engine crank case, problems have developed from the lack of an oil filled air environment in the racing engine. One of the problems results from friction by the blueing or burnishing of the piston wrist pins. Another more well known problem is burning pistons. A racing engine enjoins the gains from a negative pressurized crank case but, at the same time, eliminates a great source of cooling for the piston dome because of the lack of oil droplets in the air contacting the bottom of the piston dome to help keep the dome cool. The oil is sucked from the crank case with a highly efficient pump scavenging system.

The present invention is directed towards a method of attaching an internal combustion engine piston oiler to oil the piston dome and wrist pin area. The system is internally plumbed into the crank shaft oil supply to make a fine oil spray available to the piston dome and wrist pin area without creating an oil heavy atmosphere inside the engine.

In the past, there have been variety of lubricating devices for internal combustion engines including a number of U.S. patents. The Tsai et al. patent, U.S. Pat. No. 4,794,896, is a lubricating device for a two-stroke gasoline engine in which the cylinder is furnished with one to three lubricant outlets which are placed just under the bottom piston ring upon the piston reaching its lowest point. In the Schubert patent, U.S. Pat. No. 5,201,805, a wear reducing piston for a combustion engine is achieved with a new type of piston with a special channel for collecting lubricants and distributing the lubricants during the piston movement. The Crouse patent, U.S. Pat. No. 5,002,025, is a lubricating oil permeable cylinder wall ring located on the inside surface of the cylinder. The Chiles et al. patent, U.S. Pat. No. 4,742,803, is a reciprocating internal combustion engine which has at least one lubricant discharge nozzle provided in the cylinder liner in communication with the annular groove and opening in the crank case side of the piston. The nozzle is angled towards the combustion chamber, such as to discharge lubricant onto the crank side of the piston. The Yamaguchi et al. patent, U.S. Pat. No. 4,280,455, is an internal combustion engine with a pair of oil ports provided in a wall member of the cylinder to provide oil to this base through the oil ports. The Sorg patent, U.S. Pat. No. 2,011,833, is an internal combustion engine having a passageway for conducting lubricating oil from a lubricating chamber to a pin for connecting the rod to the cross head.

The present invention deals with a method of attaching an internal combustion engine piston oiler for oiling the piston and wrist pin area of each piston in an internal combustion engine utilizing the crank shaft oil supply in a racing engine where the oil level has been reduced in the engine having a vacuum created inside the engine crank case. This allows the lubrication of these components of a racing engine without a loss of power from an increased level of oil in the engine crank case.

SUMMARY OF THE INVENTION

A method of attaching an internal combustion engine piston oiler to an internal combustion engine includes the step of removing a crank shaft from an internal combustion engine to expose a plurality of block main bearing surfaces, selecting a drill guide shaped to fit one of the engine block main bearing surfaces, which drill guide has a predetermined drill guide bore therethrough, and positioning the selected drill guide on the engine block main bearing surface. The method includes positioning a drill bit through the bore in the selected drill guide and drilling a predetermined bore through the engine block webbing from one main bearing surface into the rear or bottom of the engine cylinder and then tapping the bore drilled into the engine block and installing an oil metering jet into the drilled and tapped bore. The method also includes drilling an aperture into the oil groove in the crank shaft main bearing generally aligned with the engine main bearing surface drilled opening and then replacing the crank shaft in the engine block with the engine oil jet installed to enhance the lubrication of the engine piston dome and wrist pin. The process is repeated for each of the engine cylinders.

BRIEF DESCRIPTION OF THE DRAWINGS

Other objects, features, and advantages of the present invention will be apparent from the written description and the drawings in which.

DESCRIPTION OF THE PREFERRED EMBODIMENT

Figure 1:
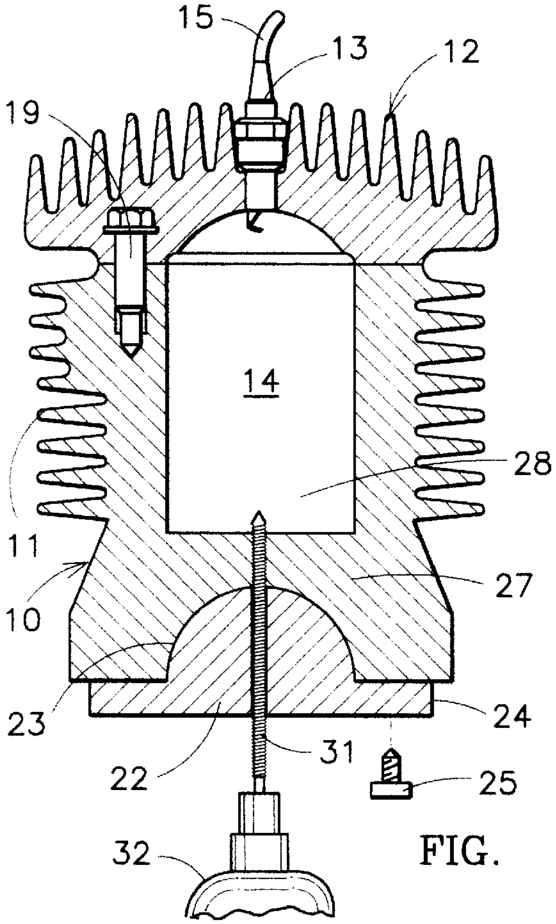
FIG. 1 is a sectional view through an engine cylinder being drilled in accordance with the present invention.
Figure 2:
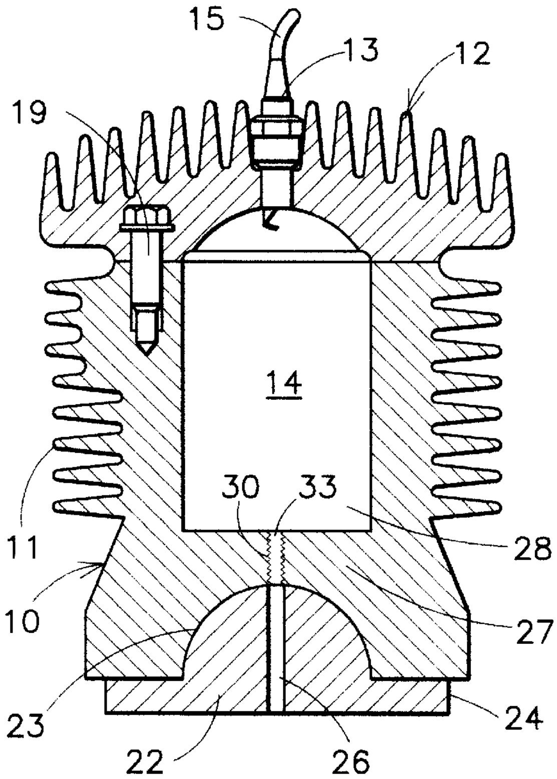
FIG. 2 is a sectional view of the engine of FIG. 1 having a bore drilled in the block webbing.
Figure 3:
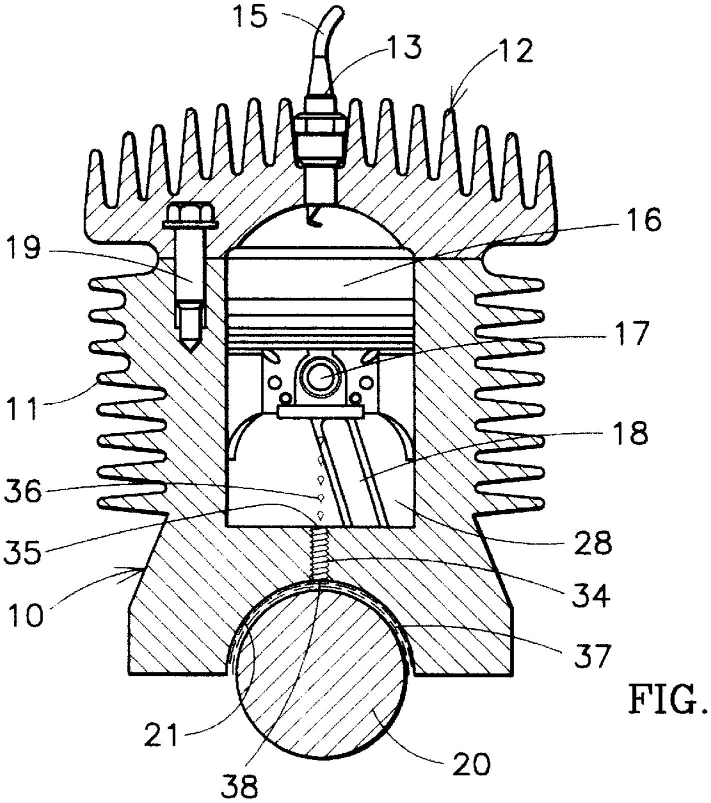
FIG. 3 is a sectional view of the engine of FIGS. 1 and 2 with the crank shaft installed.

Referring to the drawings of FIGS. 1 through 3, the process of the present invention is illustrated in which a piston oiler for an internal combustion engine is being attached to an internal combustion engine. In the drawing of FIGS. 1 through 3, a single cylinder internal combustion engine is illustrated having an engine block 10 having cooling fins 11 formed therein and a cylinder head 12 attached thereto having a spark plug 13 attached through the cylinder head and into the cylinder 14. Spark plug cable 15 connects the spark plug. The cylinder head 12 is bolted with bolts 19 to the block 10. The block has the cylinder 14 therein for slidably mounting the piston 16, as seen in FIG. 3. The piston is connected with a wrist pin 17 and piston crank 18 to the crank shaft 20. In FIGS. 1 and 2, the engine has been disassembled and the crank shaft 20 removed. The crank shaft 20 is supported to the engine block 10 on the block main bearing surfaces 21 so that the block 20 forms a main bearing saddle for supporting the crank shaft 20. A drill guide and fixture 22 has an arcuate area 23 shaped to fit the main bearing surfaces 21 and a pair of flanged areas 24 which can be bolted with bolts 25 to the block 10 and supported in place, as shown in FIGS. 1 and 2. The drill guide 22 has a bore 26 extending therethrough at the specific location and angle for a specific engine for drilling through the block webbing 27 and into the bottom area 28 of the cylinder 14.

As illustrated in FIG. 2, the bore 30 has been drilled through the webbing 27 with a drill bit 31 of predetermined size with a hand drill 32. The hole 30 has also been tapped with threads 33 which extend partway through the bore 30 but do not extend all the way to the end of the bore 30. The drilled and tapped hole then have an oil metering jet 34 installed which may be threaded to the end of the threads where they are blocked by the area 35 that has not been tapped. The oil jet 34 is of a predetermined size to distribute the oil droplets 36 aimed directly beneath the piston 16 towards the wrist pin 17 area for oiling the wrist pin 17 and the bottom of the piston. Crank case 20 bearing 37 is also drilled at a point directly in alignment with the drilled opening 34 so that a portion of the oil delivered to the crank shaft bearing is picked up through an opening 38 into the bore 30 and through the oil jet nozzle 34 for delivery into the wrist pin area 17 of the back of the piston 16 in the cylinder 14.

Figure 4:
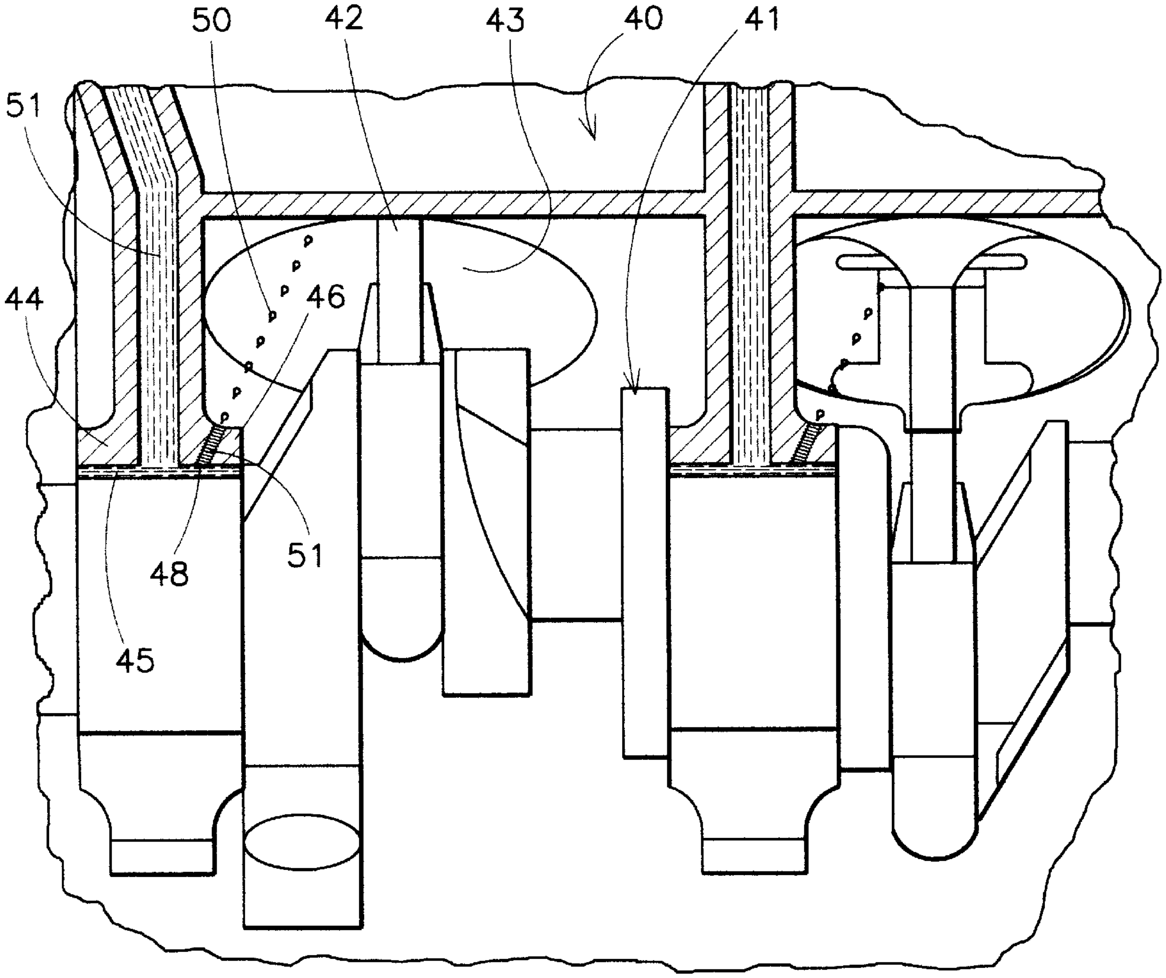
FIG. 4 is a side sectional view of an internal combustion engine having an oiler of the present invention attached.

FIG. 4 illustrates an engine block 40 having a crank shaft 41 mounted therein and connected to the crank rods 42 extending into each cylinder 43. The crank shaft main bearing area 44 has the bearing 45 therein and the block webbing 46 has the oil jet 47 mounted therein with a hole 48 drilled in the bearing 44 and distributing oil droplets 50 into the bottom of the cylinder 43. The bearing receives oil from the oil channel 51. In the case of a multiple cylinder engine, the drilled openings 51 are at an angle through the webbing 46 for each cylinder 43.

The process of the present invention first disassembles the bottom of the engine and removes the crank shaft 20 in FIG. 3 or 41 in FIG. 4. The engine block is positioned so that the main bearing saddle faces upwards to the installer. A drill guide fixture 22, as shown in FIGS. 1 and 2, is selected for the particular engine and positioned on the main bearing saddle over the main bearing area and attached with the bolt 25 to the engine block 10. After bolting the fixture 22 in place and taking an elongated drill bit 31 attached to a hand drill 32 and positioning the drill bit 31 in the bore 26 of the fixture 22, the bore 30 is drilled through the engine block webbing 27. Each cylinder base is drilled in a multiple cylinder engine before removing the fixtures 22 and each of the bores 30 are tapped partway through each bore 30. In a typical engine, an 8⁄32 drill tap may be used to tap to a depth of 0.300 inches below the housing bore but not all the way through the webbing 27. Thus, the end of the threads can be used to set the depth of the metering jet to the proper position. Once bore 30 has been drilled and tapped, both ends of the newly drilled and tapped opening are deburred for each cylinder. The engine block is then cleaned and a metering jet 34 is installed on each of the drilled and tapped bores. The next step involves drilling a corresponding hole 38 in the oil groove of each main bearing to feed the jets. Typically, a 0.040 inch hole is drilled directly over each metering jet so that the metering jet can pick up oil from the crank shaft bearing.

The present invention is directed towards racing engine which have reduced the amount of oil in the engine block so as to reduce the friction of the rotating crank shaft and which uses the vacuum inside the engine crank case as a scavenger to remove oil fumes and which does provide insufficient cooling and lubrication to the wrist pins and piston dome areas. However, the present invention should not be considered as limited to the forms shown which are to be considered illustrative rather than restrictive.

I claim:

1. A method of attaching an internal combustion engine piston oiler to an internal combustion engine block having block webbing and a main bearing saddle with main bearing surfaces supporting a plurality of main bearings supporting a crankshaft therein, said engine block having at least one cylinder therein and having a piston with a piston dome and piston wrist pin mounted in the cylinder comprising the steps of:

removing the crank shaft from the internal combustion engine block and from the main bearing saddle to expose a plurality of block main bearing surfaces;

selecting a drill guide shaped to fit the engine block main bearing saddle over one main bearing surface and having a predetermined drill guide bore therethrough;

positioning the selected drill guide on one engine block main bearing surface;

positioning a drill bit through said bore in said selected drill guide;

drilling a predetermined bore through the engine block webbing from one main bearing surface into the rear of the at least one engine cylinder;

tapping said bore drilled into the engine block webbing;

installing an oil metering jet into said drilled and tapped bore;

drilling an aperture into the crankshaft main bearing generally aligned with said engine block main bearing surface drilled opening; and replacing the crankshaft in the engine block;

whereby an engine oil jet is installed to enhance the lubrication of an engine piston dome and wrist pin.

2. A method of attaching an internal combustion engine piston oiler in accordance with claim 1 including the step of drilling a bore into a plurality of internal combustion engine main bearing surface areas for attaching an oil jet for each engine cylinder.

3. A method of attaching an internal combustion engine piston oiler in accordance with claim 1 including the step of bolting said selected drill guide to said engine block prior to drilling said predetermined bore.

4. A method of attaching an internal combustion engine piston oiler in accordance with claim 3 in which the step of installing an oil metering jet includes installing a pressure activated oil metering jet.

5. A method of attaching an internal combustion engine piston oiler in accordance with claim 4 in which the step of tapping said bore includes tapping said bore only a portion of the way through said drilled bore.

6. A method of attaching an internal combustion engine piston oiler in accordance with claim 5 including the step of deburring said drilled bore.

7. A method of attaching an internal combustion engine piston oiler in accordance with claim 5 in which the step of selecting a drill guide includes selecting a drill guide shaped to fit an internal combustion engine main bearing saddle main bearing area.

8. A method of attaching an internal combustion engine piston oiler in accordance with claim 7 in which the step of selecting a drill guide includes selecting a drill guide having a plurality of drill guide bores therethrough.

9. A method of attaching an internal combustion engine piston oiler in accordance with claim 8 in which the step of selecting a drill guide includes selecting a drill guide having a generally arcuate side sized to fit the main bearing area of a crankshaft main bearing area and having a pair of flanges extending therefrom.

* * * * *